United States Patent

[11] 3,594,024

| [72] | Inventor | Siegfried Hertell<br>Kelsterbach, Germany |
|---|---|---|
| [21] | Appl. No. | 867,177 |
| [22] | Filed | Oct. 17, 1969 |
| [45] | Patented | July 20, 1971 |
| [73] | Assignee | International Telephone and Telegraph Corporation<br>New York, N.Y. |
| [32] | Priority | Oct. 19, 1968 |
| [33] | | Germany |
| [31] | | P 18 04 037.4 |

[54] PISTON AND ROD ASSEMBLY
7 Claims, 2 Drawing Figs.

[52] U.S. Cl. .................................................. 287/53 R, 287/20 P
[51] Int. Cl. .................................................. F16d 1/06
[50] Field of Search ....................................... 287/20 P, 53, DIG. 7

[56] References Cited
UNITED STATES PATENTS

| 861,143 | 7/1907 | Scott | 287/53 X |
| 1,179,060 | 4/1916 | Williamson | 287/53 |
| 1,418,379 | 6/1922 | Karle | 287/DIG. 7 |
| 2,650,843 | 9/1953 | Spurgeon | 287/DIG. 7 |
| 2,897,022 | 7/1959 | Marola | 287/53 X |

FOREIGN PATENTS

| 641,240 | 4/1928 | France | 287/53 |
| 180,032 | 8/1966 | U.S.S.R. | 287/53 |

Primary Examiner—David J. Williamowsky
Assistant Examiner—Andrew V. Kundrat
Attorneys—C. Cornell Remsen, Jr., Walter J. Baum and Paul W. Hemminger ABSTRACT: A rigid piston and rod connection in a hydraulic accumulator wherein a piston rod extending through an axial bore in the piston has a retainer ring fitted in an annular groove in the piston rod. A cover plate over the end of the piston rod clamps the retainer ring between one side of the annular groove and a bearing plate on the front face of the piston to provide the rigid connection and hold the piston rod perpendicular to the piston.

3,594,024

PISTON AND ROD ASSEMBLY

CROSS REFERENCE TO RELATED APPLICATION

This application is filed under the provisions of 35 USC 119 with a claim for the benefit of the filing date of an application covering the same invention filed on Oct. 19, 1968 Ser. No. P 18 04 037.4 in the Federal Republic of Germany.

BACKGROUND OF THE INVENTION

The invention relates to means for rigidly connecting a piston to a piston rod and particularly to a connection of this type for an aircraft hydraulic-pressure accumulator.

High pressure hydraulic accumulators for use in aircraft hydraulic systems must satisfy stringent performance requirements while being as small and light as possible. To keep the weight low, they are often manufactured from light weight alloys and in the case of light alloy pistons a problem arises in providing a strong, light nontilting connection between the piston and piston rod.

When the piston rod of a hydraulic accumulator is relatively small compared with the diameter of the cylinder, a problem arises, especially with light alloy pistons, because the bearing pressure on surface in the piston bore may exceed the permissible load value of the material, particularly when the bore is short.

A conventional method of connecting the two parts is to pass the piston rod through the piston and to screw a nut on the projecting free end of the piston rod. The nut presses the piston against a shoulder on the piston rod or a spacer ring inserted between a shoulder on the piston rod and the rear side of the piston, thus fixing the piston to the rod.

In a connection of this type considerable notch stresses develop in the piston rod and have to be balanced by larger dimensioning to meet the very high pressure in the accumulator. High notch stresses also occur in the thread at the projecting end of the piston rod in the area of the piston front face. Another area of stress is where the bottom side of the piston comes to lie against a shoulder provided on the piston rod when the nut is tightened. Moreover, the processing tolerance cannot ensure that the angle between the piston front face and the axis of the piston rod is exactly 90°.

SUMMARY OF THE INVENTION

It is an object of this invention to provide a connection between a piston and piston rod which securely holds the rod normal to the plane of the piston and which is extremely light in weight and compact.

This is achieved by an annular recess or groove in the piston rod in the area of the front face of the piston into which a retainer ring is fitted in such a way that the peripheral ring face is brought into engagement with a guide or bearing plate arranged between the front face of the piston and the retainer ring.

Preferably the annular recess in the piston rod is formed by joining three surfaces, two of which being generated by a quarter circle rotating around the axis of the piston rod. The edges of the quarter circles having the smaller diameter are joined with each other by a cylindrical surface.

The guide plate in the area of the peripheral surface of the retainer ring has an annular recess which is formed by joining two surfaces of rotation, the first surface formed by rotating a segment of a circle having a radius equal to that of the retainer ring, and the second being a cylindrical surface of rotation. Further, it is advantageous that the retainer ring has an absolutely round cross section corresponding to the radius of the two annular recesses. The end of the piston rod is forced toward the piston by a tightening plate which encloses the front face of the piston rod and is connected to the piston by means of screws.

The retainer ring may be made in a single or several pieces.

DESCRIPTION OF THE PREFERRED EMBODIMENT

Figure 1:
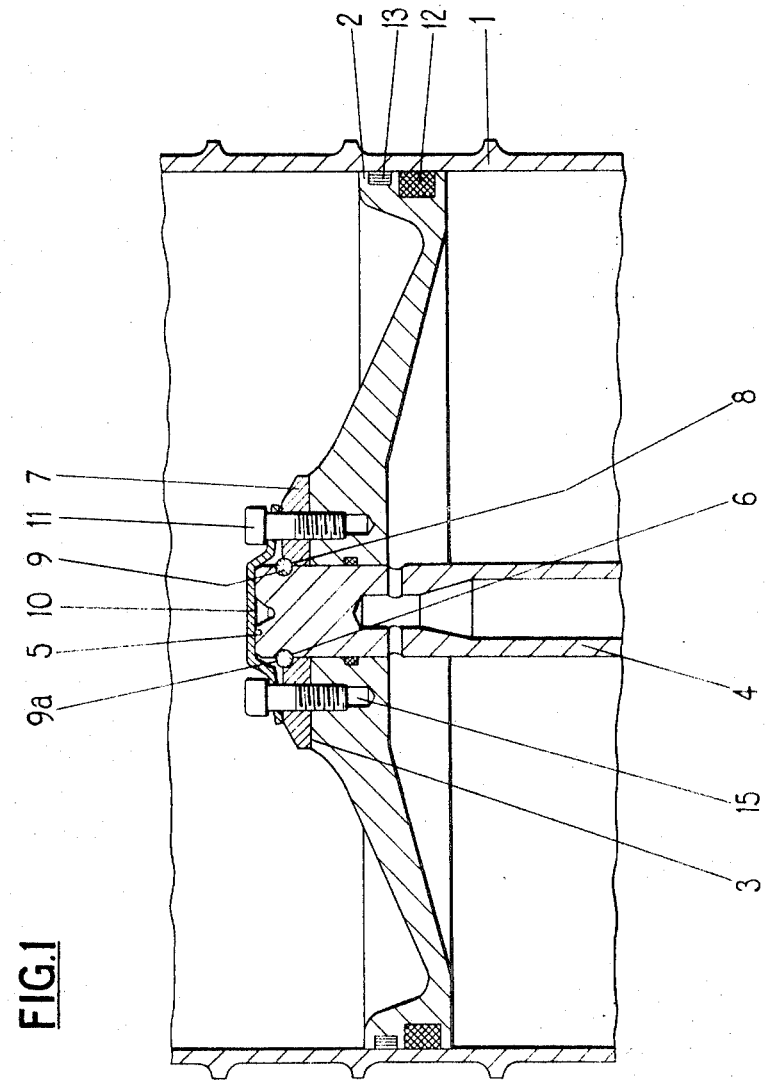
FIG. 1 is a partial sectional view of a hydraulic-pressure accumulator embodying the present invention.

The section of the hydraulic-pressure accumulator illustrated in FIG. 1 essentially comprises a cylindrical casing 1, a piston 2 guided by the piston rod 4 and engaging the inner walls of the casing and the parts connecting the piston rod 4 with the piston 2. The piston 2, which is made of light metal alloy, is slidably arranged to move in the cylindrical casing 1 in this case a low-pressure cylinder of high tensile malleable aluminum alloy. To avoid direct contact of these two parts during operation, the piston 2, which is of slightly smaller diameter than the cylinder, has a synthetic ring 13, preferably made of a synthetic resin polymer such as is sold under the trademark Teflon, mounted on its periphery. The piston is sealed by an O-ring 12. Temperature variations do not change the clearance between the casing 1 and the piston 2, since both parts are made of the same material.

The piston rod 4 is manufactured of a high tensile heat treatable steel and chromium plated on the sliding surface to improve the friction properties and to reduce wear.

Figure 2:
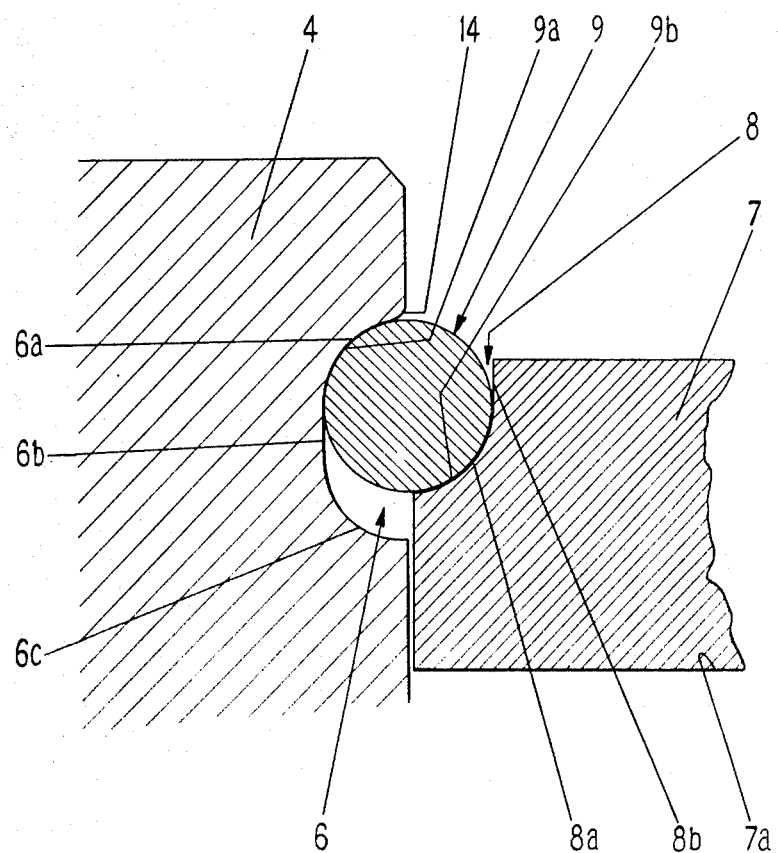
FIG. 2 is an enlarged partial sectional view of the retainer ring and of its contact faces.

The piston rod 4 is mounted to the piston 2 in the following way: the piston rod 4 passing through the piston 2 provides an annular recess or groove 6 in the area of the front face 3 of the piston 2. The cross section of this recess is illustrated in FIG. 2. Into this recess a retainer ring 9 is inserted. The shape of the annular groove 6 ensures a reliable engagement of the face 9a of the retainer ring 9, contacting the annular recess 6 at 6a. The opposite face 9b of the retainer ring 9 lies in an annular recess 8 of the same radius cut into the guide or bearing plate 7 which rests on the piston front face 3. This annular recess 8 forms a face 8a in the contact area of the retainer ring 9, the face having the same radius as the retainer ring 9 and running into a cylinder surface 8b on the side remote from the front face of the piston.

To stiffen this connection and to prevent the piston rod 4 from slipping out of the piston 2, a retainer plate 10 is provided which covers the front face 5 of the piston rod 4 like a cap. Screws passing through holes in the retainer plate 10 and guide plate 7 engage the piston to hold the assembly together. Thus the guide plate 7 presses its face 8a against the radially outer face 9b of the retainer ring 9 and at the same time the diagonally opposite face of the retainer ring 9 against the respective face 6a of the annular recess 6. To facilitate assembly the retainer ring 9 may consist of several sections.

The transition area between the annular recess 6 in the piston rod and the cylindrical rod surface is rounded off at 14.

It will be appreciated that the invention illustrated and described herein may be modified by those skilled in the art without deviating from the spirit and scope of the invention as set forth in the following claims.

I claim as my invention:

1. In combination, a piston having an axial bore through the center, a piston rod having an end extending through the bore in the piston, the rod having an annular groove in its periphery adjacent the end of the rod, a retainer ring in the annular groove, the retainer ring having an outer diameter substantially greater than the bore in the piston, an annular bearing plate between the retainer ring and the front face of the piston, a cover plate over the end of the piston rod and means for forcing the cover plate toward the piston to provide a rigid connection between the piston and piston rod.

2. The combination as defined in claim 1 wherein the retainer ring is formed from several pieces.

3. The combination as defined in claim 1 wherein the parts of the bearing plate and annular groove in the piston rod in the area where they contact the retainer ring have the same cross-sectional shape as the retainer ring to provide maximum bearing surface.

4. The combination as defined in claim 3 wherein the retainer ring is circular in cross section and the recess in the bearing plate and the annular groove in the piston rod are circular segments in cross section.

5. The combination as defined in claim 1 wherein the means for forcing the cover plate toward the piston are bolts clamping the cover plate to the piston.

6. The combination as defined in claim 3 wherein the means for forcing the cover plate toward the piston are bolts clamping the cover plate to the piston.

7. The combination as defined in claim 4 wherein the means for forcing the cover plate toward the piston are bolts clamping the cover plate to the piston.